United States Patent
Kim et al.

(10) Patent No.: US 8,614,730 B2
(45) Date of Patent: Dec. 24, 2013

(54) METHOD OF CONVEYING EMOTION IN VIDEO TELEPHONE MODE AND WIRELESS TERMINAL IMPLEMENTING THE SAME

(75) Inventors: Hwan Kim, Gumi-si (KR); Jeong-Hoon Kim, Gumi-si (KR); Chae-Whan Lim, Daegu (KR)

(73) Assignee: Samsung Electronics Co., Ltd (KR)

( * ) Notice: Subject to any disclaimer, the term of this patent is extended or adjusted under 35 U.S.C. 154(b) by 1481 days.

(21) Appl. No.: 11/376,302

(22) Filed: Mar. 16, 2006

(65) Prior Publication Data

US 2007/0033534 A1  Feb. 8, 2007

(30) Foreign Application Priority Data

Jul. 22, 2005  (KR) .................. 10-2005-0066876

(51) Int. Cl.
*H04N 7/14* (2006.01)

(52) U.S. Cl.
USPC .................. 348/14.01; 455/566; 455/412.1; 455/414.1

(58) Field of Classification Search
USPC .................. 455/566, 550, 557; 379/142; 348/14.01–14.08
See application file for complete search history.

(56) References Cited

U.S. PATENT DOCUMENTS

| | | | |
|---|---|---|---|
| 6,587,138 B1 | 7/2003 | Vogt et al. | |
| 6,825,873 B2 * | 11/2004 | Nakamura et al. | 348/14.02 |
| 7,003,040 B2 * | 2/2006 | Yi | 375/240.24 |
| 7,339,604 B1 * | 3/2008 | Barraclough et al. | 348/14.01 |
| 7,697,960 B2 * | 4/2010 | Seo et al. | 455/566 |
| 7,808,521 B2 * | 10/2010 | Lengeling et al. | 348/14.08 |
| 7,913,176 B1 * | 3/2011 | Blattner et al. | 715/758 |
| 8,174,556 B1 * | 5/2012 | Barraclough et al. | 348/14.01 |
| 8,271,030 B2 * | 9/2012 | Lee | 455/556.1 |
| 2004/0064510 A1 * | 4/2004 | Ooi et al. | 709/205 |
| 2004/0097221 A1 * | 5/2004 | Lee | 455/419 |
| 2005/0050141 A1 * | 3/2005 | An et al. | 709/203 |
| 2005/0069852 A1 | 3/2005 | Janakiraman et al. | |
| 2005/0253850 A1 * | 11/2005 | Kang et al. | 345/473 |
| 2009/0040289 A1 * | 2/2009 | Hetherington et al. | 348/14.12 |

FOREIGN PATENT DOCUMENTS

| | | |
|---|---|---|
| EP | 1536645 | 6/2005 |
| KR | 10-2004-0110875 | 12/2004 |
| WO | WO2004111901 | 12/2004 |

* cited by examiner

*Primary Examiner* — Maria El-Zoobi
(74) *Attorney, Agent, or Firm* — The Farrell Law Firm, P.C.

(57) ABSTRACT

Provided is a method and wireless terminal for enabling the user of the wireless terminal to transmit an emoticon representing an emotion to another party. The method and terminal are provided where at least one emoticon may be displayed in a video telephone mode and a selected emoticon may be displayed and transmitted to the other party.

23 Claims, 3 Drawing Sheets

METHOD OF CONVEYING EMOTION IN VIDEO TELEPHONE MODE AND WIRELESS TERMINAL IMPLEMENTING THE SAME

CROSS-REFERENCE TO RELATED APPLICATIONS

This application claims the benefit under 35 U.S.C. §119(a) of Korean Patent Application No. 2005-66876, filed Jul. 22, 2005 in the Korean Intellectual Property Office, the entire contents of which are hereby incorporated by reference.

BACKGROUND OF THE INVENTION

1. Field of the Invention

The present invention relates to a method and wireless terminal for conveying an emotion to another party while in video telephone mode. More particularly, the present invention relates to a method and a wireless terminal where an emoticon representing an emotion can be transmitted to another party while performing video communication.

2. Description of the Related Art

Presently, wireless mobile phones have been developed so as to have a structure which enables high-speed data transmission in addition to conventional voice communication. Namely, mobile communications networks, according to IMT 2000 specifications, may facilitate high-speed data communication in addition to voice communication with a wireless mobile terminal. The data transmitted through the wireless terminal in data communication may include packet data and video data. Wireless terminals have also been provided with a camera and video receiver to add a video displaying function, so that it may display or transmit moving or still pictures taken by the camera, and display received video signals.

Thus, a wireless terminal having video communication function enables the user to transmit and receive video data together with audio data. If such a wireless terminal with video communication function is provided with means for transmitting an emoticon representing an emotion to another party, the video communication will become far more vivid and friendly. Accordingly, there is a need for an improved method of conveying an emotion on a wireless terminal.

SUMMARY OF THE INVENTION

Exemplary embodiments of the present invention address at least the above problems and/or disadvantages and provide at least the advantages described below. Accordingly, an aspect of the present invention is to provide a method and wireless terminal enabling a user to display on his or her wireless terminal, and transmit to another party, an emoticon representing an emotion.

According to an exemplary embodiment of the present invention, a method and wireless terminal for conveying an emotion to another party in video telephone mode are provided, where at least one emoticon may be displayed while in the video telephone mode, and a selected emoticon is displayed and transmitted to the other party.

According to another exemplary embodiment of the present invention, a method and wireless terminal for conveying an emotion to another party while in video telephone mode are provided, where at least one emoticon is displayed, if selection is made for an emoticon function in the video telephone mode, and a selected emoticon is stored into a temporary buffer for display and transmission of the selected emoticon to the other party.

Other objects, advantages and salient features of the invention will become apparent to those skilled in the art from the following detailed description which, taken in conjunction with the annexed drawings, discloses exemplary embodiments of the invention.

BRIEF DESCRIPTION OF THE ATTACHED DRAWINGS

The above and other objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
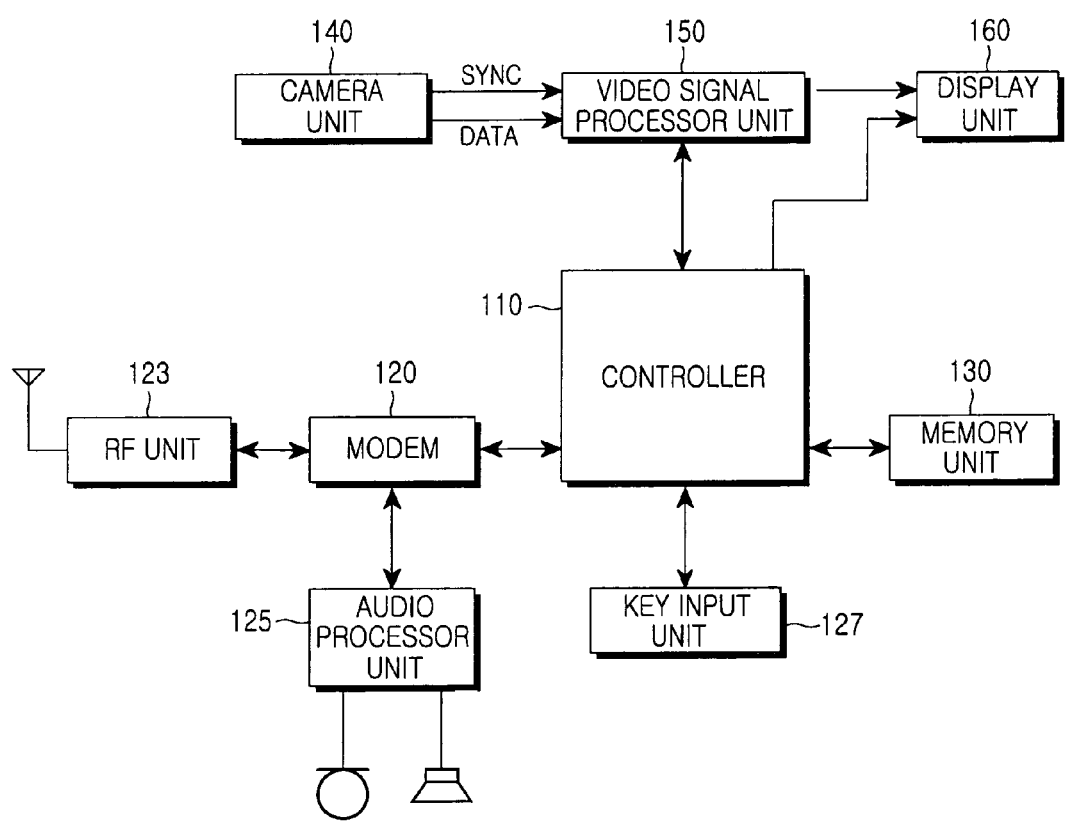
FIG. 1 is a block diagram for illustrating the functional structure of a wireless terminal according to an exemplary embodiment of the present invention.

Referring to FIG. 1, an RF unit 123 for wireless communication comprises an RF transmitter for modulating and amplifying the frequency of a transmitted signal and an RF receiver for demodulating and low-noise amplifying a received signal. A modem 120 transforms digital signals from a controller 110 into corresponding analog signals which are delivered to the RF unit 123. The modem 120 also transforms the analog signals from the RF unit into corresponding digital signals which are delivered to an audio processor 125 or the controller 110. The audio processor 125 comprises a data codec for processing packet data and an audio codec for processing audio signals such as voice signals. The audio processor 125 converts digital audio signals from the modem 120 into corresponding analog signals delivered to a speaker. The audio processor 125 also converts analog audio signals from a microphone into corresponding digital signals delivered to the modem 120. The audio processor may be a separate unit or a built-in element of the controller 110.

A memory unit 130 comprises a program memory and a data memory. The program memory stores programs for controlling the general operations of the wireless terminal including programs for controlling the procedure of displaying and transmitting an emoticon in the video telephone mode according to the present invention. Meanwhile, the data memory temporarily stores data generated during execution of the programs. The data memory also stores various kinds of emoticon including downloaded data and video data. The kinds of emoticon made of video data include those taken by the wireless terminal and stored as emoticon format, and those previously stored as emoticon format.

The controller 110 controls all functions of the wireless terminal and may be designed so as to include the modem 120 and the audio processor 125. The controller 110 also controls the memory 130 so as to display emoticon stored and to transmit a selected kind of emoticon when the wireless terminal is in the video telephone mode.

Also provided is a camera unit 140 which comprises a camera sensor for converting optical signals of a captured image into corresponding electrical signals, and a signal processor for converting the electrical signals from the camera sensor into corresponding digital data. The camera sensor may be a CCD sensor, and the signal processor a DSP (Digital Signal Processor). The camera sensor and the signal processor may be integrally combined, or separately formed.

A video signal processor unit 150 processes video signals from the camera unit 140 by frames so as to generate frame video data fitting the characteristics and size of a display unit 160. The video signal processor unit 150 includes a video codec to compress the frame video data or decompress the compressed frame video data according to a prescribed process. The video codec may be JPEG, MPEG4, Wavelet, and the like. The video signal processor unit 150 is provided with an OSD (On Screen Display) function to generate OSD data according to the screen size under the control of the controller 110.

The display unit 160 displays both the video signals from the video signal processor unit 150 and user data transferred from the controller 110. The display unit 160 may comprise an LCD unit, LCD controller, and memory for storing the video data. The LCD unit may be formed with a touch screen to serve as an input unit. The display unit 160 also displays different kinds of emoticons and a selected emoticon when the wireless terminal is in the video telephone mode.

A key input unit 127 includes keys for inputting information such as numbers and characters as well as keys for setting various functions. The key input unit 127 may also be provided with a particular key for selecting an emoticon and displaying and transmitting a selected emoticon. Alternatively, separate particular keys may be provided for the different functions of selecting, displaying and transmitting.

Hereinafter is described a process for displaying and transmitting an emoticon, according to an exemplary embodiment of the present invention, with reference to FIGS. 2 and 3A-C.

Figure 2:
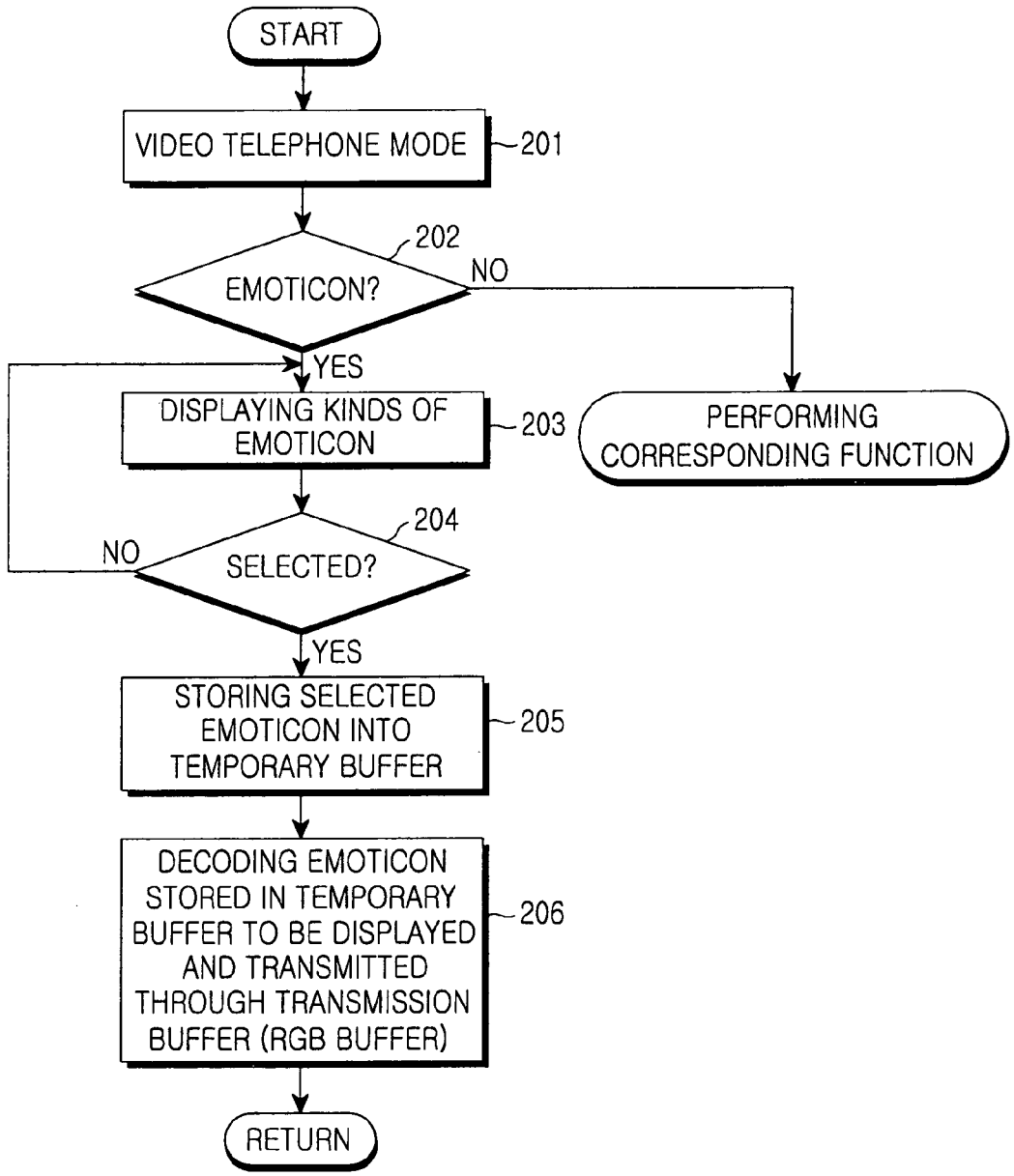
FIG. 2 is a flow chart for illustrating an exemplary implementation of a method of displaying and transmitting an emoticon in the video telephone mode of a wireless terminal according to an embodiment of the present invention.

Referring to FIG. 2, when an emoticon function is selected in the video telephone mode of the wireless terminal in step 201, the controller 110 controls, in step 202, the memory unit 130 to display at least one emoticon stored therein in step 203. The controller controls, in step 203, the display 160 to present at least one of the different kinds of emoticon stored in the memory unit 130. Any kind of emoticon stored in the memory unit 130 may be selected by the user for display. The emoticon(s) may be displayed in, for example, a bar type format.

The emoticon(s) may be downloaded into the memory unit 130. In addition, the emoticon(s) may include video data taken by the camera unit 140 of the wireless terminal that have been scaled to the emoticon format and stored in the memory unit 130. Also, the emoticon(s) may be selected from the video data that have already been stored in the memory unit 130, scaled to the emoticon format and stored again into the memory unit 130.

Figure 3A:
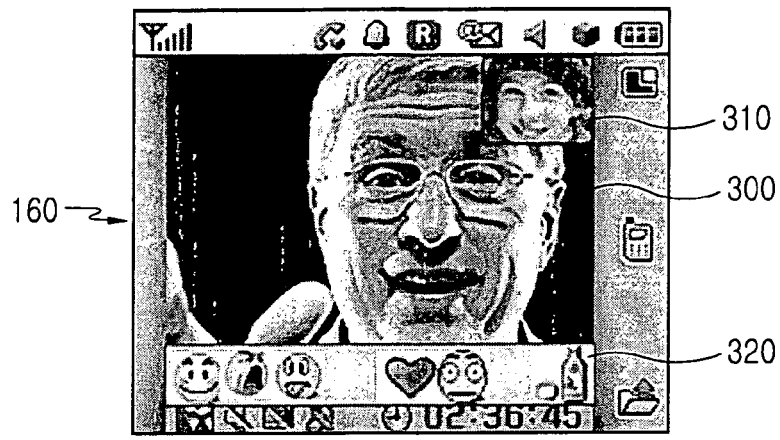
FIGS. 3A to 3C illustrate the procedure of FIG. 2.

FIG. 3A shows an example of emoticons being presented in a bar type format in step 203. As shown in FIG. 3A, the display is divided into three zones, namely, a first zone 300 for displaying the other party's video data, a second zone 310 for displaying the user's video data, and a third zone 320 for displaying emoticon(s) in a bar type format.

In step 204, a user may select one of the emoticon displayed in the bar type format as shown in FIG. 3A by using, for example, an arrow key. After an emoticon is selected, the controller 110 directs the memory unit 130 to store the selected emoticon into a temporary buffer in step 205. The controller 110 also temporarily blocks the user's video data from being displayed in the second zone 310 as shown in FIG. 3A and decodes the selected emoticon stored in the temporary buffer so that it may be displayed in the second zone 310 in step 206.

Also in step 206, the controller 110 directs the temporary buffer to transfer the selected emoticon to a transmission buffer (RGB buffer) to transmit it to the wireless terminal of another party, which then displays the received emoticon instead of the other party's video data.

Figure 3B:
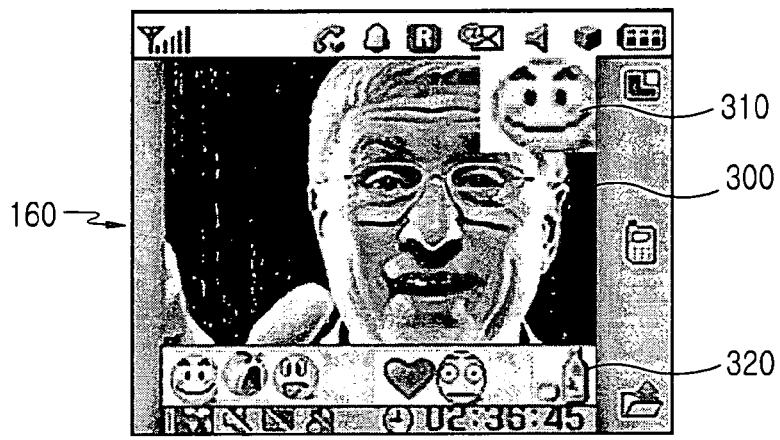
Figure 3C:
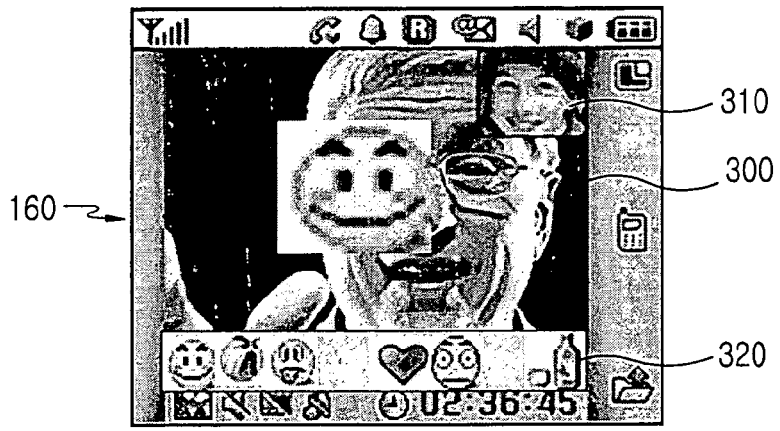

In step 206, the selected emoticon may be displayed in the second zone 310 in place of the user's video data as shown in FIG. 3B. Alternatively, the selected emoticon may be superimposed on the other party's video data being displayed in the first zone 300 as shown in FIG. 3C. In case of FIG. 3C, the user's video data is continuously displayed in the second zone 310 while the other party's terminal receives the selected emoticon instead of the user's video data. Namely, the controller 110 may superimpose the selected emoticon decoded on a portion of the first zone 300 as well as display the user's video data in the second zone 310 in real time, as shown in FIG. 3C.

Referring back to FIG. 3B, the pre-selected emoticon may be displayed in the second zone 310 for a predetermined time and thereafter automatically replaced by the user's video data. Otherwise, selection by the user may cause the pre-selected emoticon to be removed from the second zone 310 and the user's video data to be displayed instead.

Similarly, referring again to FIG. 3C, the pre-selected emoticon may be superimposed in the first zone 300 for a predetermined time and thereafter automatically replaced by the other party's video data. Otherwise, selection by the user may cause the pre-selected emoticon to be removed from the first zone 300 and the other party's video data to be displayed instead. While displaying and transmitting the emoticon in the video telephone mode as shown in FIGS. 2 and 3A-C, the user may simultaneously perform voice communication with the other party by exchanging audio data.

Thus, the inventive method provides the user of the wireless terminal with means for transmitting an emoticon representing an emotion to the other party, so that the video communication may become more vivid and friendly.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of transmitting an emoticon to another party in video telephony mode, the method comprising the steps of:
    displaying another party's video data on a first area of a display unit, a user's video data on a second area of the display unit, and a plurality of emoticons on a third area of the display unit in a video telephony mode;
    selecting one of the plurality of emoticons during the video telephony mode from a user input; and
    displaying the selected emoticon on the first area or on the second area and transmitting the selected emoticon to another party.

2. The method of claim 1, wherein the at least one emoticon comprises at least one of downloaded data and video data.

3. The method of claim 2, wherein the video data comprises at least one of video data taken by a wireless terminal and stored as emoticon format, and video data previously stored as emoticon format.

4. The method of claim 1, wherein the at least one emoticon is displayed in a bar type format.

5. The method of claim 1, further comprising the steps of:
storing the selected emoticon in a temporary buffer; and
displaying the selected emoticon stored in said temporary buffer by decoding while delivering it to a transmission buffer for transmission to the other party.

6. The method of claim 5, wherein the emoticon stored in said transmission buffer is displayed and transmitted after temporarily blocking video data from being displayed and transmitted in the video telephony mode.

7. The method of claim 1, wherein the selected emoticon is presented on a display in an area allotted for presenting video data of a user of a wireless terminal in the video telephony mode.

8. The method of claim 1, further comprising displaying the selected emoticon superimposed on a display of a wireless terminal in the video telephony mode.

9. The method of claim 1, further comprising presenting the selected emoticon for a time period.

10. The method of claim 1, further comprising at least one of selectively displaying and selectively removing the selected emoticon.

11. A method of conveying an emoticon to another party in video telephony mode, the method comprising the steps of:
displaying another party's video data on a first area of a display unit, a user's video data on a second area of the display unit, and a plurality of emoticons on a third area of the display unit in a video telephony mode;
selecting one of the plurality of emoticons during the video telephony mode from a user input;
displaying the selected emoticon on the first area or on the second area; and
storing the selected emoticon in a temporary memory for at least one of displaying and transmission of the selected emoticon to another party.

12. The method of claim 11, wherein the plurality of emoticons comprise at least one of downloaded data and video data.

13. The method of claim 12, wherein the video data comprises at least one of video data taken by a wireless terminal and stored as emoticon format, and video data previously stored as emoticon format.

14. The method of claim 11, wherein the plurality of emoticons are displayed in a bar type format.

15. The method of claim 11, further comprising decoding the at least one emoticon stored in the temporary buffer for at least one of display and delivery to a transmission buffer for transmission to the other party after temporarily blocking video data from being displayed and transmitted in the video telephony mode.

16. The method of claim 11, wherein the selected emoticon is presented on a display in an area allotted for presenting video data of a user of a wireless terminal in the video telephony mode.

17. The method of claim 11, further comprising displaying the selected emoticon in the video telephony mode.

18. The method of claim 11, further comprising presenting the selected emoticon for a time period.

19. The method of claim 11, further comprising at least one of selectively displaying and selectively removing the selected emoticon.

20. The method of claim 1, further comprising displaying the selected emoticon.

21. A wireless terminal comprising:
a transmitter;
a display unit; and
a controller;
wherein the controller is configured to display another party's video data on a first area of a display unit, a user's video data on a second area of the display unit, and a plurality of emoticons on a third are of the display unit in a video telephony mode;
wherein the controller is configured to display the user selected emoticon on the first area or on the second area; and
wherein the transmitter, being responsive to the controller, transmits the user selected emoticon to another party during the video telephony mode.

22. The wireless terminal of claim 21, further comprising a memory for storing the selected emoticon.

23. The wireless terminal of claim 22, wherein the memory comprises a temporary buffer.

* * * * *